US009069344B2

(12) United States Patent
Schleiss et al.

(10) Patent No.: US 9,069,344 B2
(45) Date of Patent: *Jun. 30, 2015

(54) SMART PROCESS MODULES AND OBJECTS IN PROCESS PLANTS

(75) Inventors: Duncan Schleiss, Austin, TX (US); Ram Ramachandran, Austin, TX (US); Mark Nixon, Round Rock, TX (US); Michael Lucas, Leicester (GB)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/567,116

(22) Filed: Dec. 5, 2006

(65) Prior Publication Data

US 2007/0156264 A1 Jul. 5, 2007

Related U.S. Application Data

(63) Continuation of application No. 10/278,469, filed on Oct. 22, 2002, now Pat. No. 7,146,231.

(51) Int. Cl.
*G05B 15/02* (2006.01)
*G05B 19/042* (2006.01)
*G05B 23/02* (2006.01)

(52) U.S. Cl.
CPC ............ *G05B 19/0428* (2013.01); *G05B 15/02* (2013.01); *G05B 23/0267* (2013.01);
(Continued)

(58) Field of Classification Search
CPC ........... G01M 3/04; G01M 3/26; G01M 3/28; G01M 3/2807; G01M 3/2876; G05B 15/02; G05B 19/042; G05B 19/0426; G05B 23/02; G05B 23/027; G06F 8/24; G06F 8/34; G06F 11/327
USPC ............ 717/108, 116; 700/17, 27, 29, 30, 40, 700/75, 80, 83, 281, 282; 73/1.17, 40, 46, 73/49.1, 49.5, 590, 592; 137/2, 15.11; 340/500, 525, 815.4; 702/51
See application file for complete search history.

(56) References Cited

U.S. PATENT DOCUMENTS 30,280 A 10/1860 Watson
4,280,356 A * 7/1981 Stewart ...................... 73/40.5 R
(Continued)

FOREIGN PATENT DOCUMENTS

DE 197 40 972 C1 3/1999
DE 197 81 804 T1 5/1999
(Continued)

OTHER PUBLICATIONS http://www.google.com/search?sourceid=navclient&aq=t &ie=UTF-8&rlz=1T4GGLD_en_US288&q=define%3a+picture.*
(Continued)

*Primary Examiner* — Robert Fennema
*Assistant Examiner* — Jennifer L Norton
(74) *Attorney, Agent, or Firm* — Marshall, Gerstein & Borun LLP

(57) ABSTRACT

An operator interface within a process plant includes an execution engine that implements process flow modules made up of interconnected smart process objects that are aware of devices and other entities within the plant and that can perform methods to detect conditions within the plant, especially on a system-level basis. The smart process objects include a display element to be displayed to the operator, data storage for storing data pertaining to and/or received from an associated entity within a plant, inputs and outputs for communicating with other smart process objects and methods that may be executed on the stored and received data to detect plant conditions, including system-level conditions, such as leaks, errors and other conditions. Process flow modules, which may be made up of numerous interconnected smart process objects, may also include flow algorithms associated therewith to calculate mass balances, flows, etc. for the process elements within the process flow modules.

19 Claims, 5 Drawing Sheets

(52) U.S. Cl.
CPC ............... *G05B2219/23255* (2013.01); *G05B 2219/23258* (2013.01); *G05B 2219/23261* (2013.01); *G05B 2219/25428* (2013.01)

(56) References Cited

U.S. PATENT DOCUMENTS

| | | | |
|---|---|---|---|
| 4,316,952 A | 2/1982 | Wendling | |
| 4,421,716 A * | 12/1983 | Hench et al. | 376/216 |
| 4,506,324 A | 3/1985 | Healy | |
| 4,512,747 A | 4/1985 | Hitchens et al. | |
| 4,546,649 A * | 10/1985 | Kantor | 73/168 |
| 4,613,952 A | 9/1986 | McClanahan | |
| 4,628,435 A | 12/1986 | Tashiro et al. | |
| 4,663,704 A | 5/1987 | Jones et al. | |
| 4,736,320 A | 4/1988 | Bristol | |
| 4,885,717 A | 12/1989 | Beck et al. | |
| 4,972,328 A | 11/1990 | Wu et al. | |
| 4,977,529 A | 12/1990 | Gregg et al. | |
| 5,014,208 A | 5/1991 | Wolfson | |
| 5,021,947 A | 6/1991 | Campbell et al. | |
| 5,041,964 A | 8/1991 | Cole et al. | |
| 5,051,898 A | 9/1991 | Wright et al. | |
| 5,079,731 A | 1/1992 | Miller et al. | |
| 5,092,449 A | 3/1992 | Bolin et al. | |
| 5,097,412 A | 3/1992 | Orimo et al. | |
| 5,119,468 A | 6/1992 | Owens | |
| 5,159,685 A * | 10/1992 | Kung | 714/26 |
| 5,168,441 A | 12/1992 | Onarheim et al. | |
| 5,218,709 A | 6/1993 | Fijany et al. | |
| 5,241,296 A * | 8/1993 | Naka et al. | 340/525 |
| 5,268,834 A | 12/1993 | Sanner et al. | |
| 5,321,829 A | 6/1994 | Zifferer | |
| 5,347,446 A | 9/1994 | Iino et al. | |
| 5,347,466 A | 9/1994 | Nichols et al. | |
| 5,361,198 A | 11/1994 | Harmon et al. | |
| 5,428,555 A | 6/1995 | Starkey et al. | |
| 5,471,400 A * | 11/1995 | Smalley et al. | 702/51 |
| 5,485,600 A | 1/1996 | Joseph et al. | |
| 5,485,620 A | 1/1996 | Sadre et al. | |
| 5,509,116 A | 4/1996 | Hiraga et al. | |
| 5,530,643 A | 6/1996 | Hodorowski | |
| 5,546,301 A | 8/1996 | Agrawal et al. | |
| 5,555,385 A | 9/1996 | Osisek | |
| 5,576,946 A | 11/1996 | Bender et al. | |
| 5,594,858 A | 1/1997 | Blevins | |
| 5,603,018 A | 2/1997 | Terada et al. | |
| 5,611,059 A | 3/1997 | Benton et al. | |
| 5,631,825 A | 5/1997 | van Weele et al. | |
| 5,666,297 A * | 9/1997 | Britt et al. | 703/18 |
| 5,732,192 A * | 3/1998 | Malin et al. | 703/2 |
| 5,752,008 A | 5/1998 | Bowling | |
| 5,757,655 A * | 5/1998 | Shih et al. | 716/102 |
| 5,768,119 A | 6/1998 | Havekost et al. | |
| 5,796,602 A | 8/1998 | Wellan et al. | |
| 5,801,942 A | 9/1998 | Nixon et al. | |
| 5,806,053 A | 9/1998 | Tresp et al. | |
| 5,812,394 A | 9/1998 | Lewis et al. | |
| 5,818,736 A | 10/1998 | Leibold | |
| 5,821,934 A | 10/1998 | Kodosky et al. | |
| 5,826,060 A | 10/1998 | Santoline et al. | |
| 5,828,851 A | 10/1998 | Nicon et al. | |
| 5,838,563 A | 11/1998 | Dove et al. | |
| 5,862,052 A | 1/1999 | Nixon et al. | |
| 5,889,530 A * | 3/1999 | Findlay | 345/440 |
| 5,892,939 A | 4/1999 | Call et al. | |
| 5,898,860 A | 4/1999 | Leibold | |
| 5,903,455 A | 5/1999 | Sharpe, Jr. et al. | |
| 5,909,916 A | 6/1999 | Foster et al. | |
| 5,940,294 A | 8/1999 | Dove | |
| 5,950,006 A * | 9/1999 | Crater et al. | 717/140 |
| 5,960,214 A | 9/1999 | Sharpe, Jr. et al. | |
| 5,970,430 A | 10/1999 | Burns et al. | |
| 5,980,078 A | 11/1999 | Krivoshein et al. | |
| 5,983,016 A * | 11/1999 | Brodsky et al. | 717/104 |
| 5,995,753 A | 11/1999 | Walker | |
| 5,995,916 A | 11/1999 | Nixon et al. | |
| 6,003,037 A | 12/1999 | Kassabgi et al. | |
| 6,023,644 A | 2/2000 | Kinsman | |
| 6,032,208 A | 2/2000 | Nixon et al. | |
| 6,041,171 A | 3/2000 | Blaisdell et al. | |
| 6,069,629 A * | 5/2000 | Paterson et al. | 715/808 |
| 6,076,952 A * | 6/2000 | Gretta et al. | 700/83 |
| 6,078,320 A | 6/2000 | Dove et al. | |
| 6,094,600 A | 7/2000 | Sharpe, Jr. et al. | |
| 6,098,116 A | 8/2000 | Nixon et al. | |
| 6,138,174 A | 10/2000 | Keeley | |
| 6,146,143 A | 11/2000 | Huston et al. | |
| 6,157,864 A | 12/2000 | Schwenke et al. | |
| 6,161,051 A | 12/2000 | Hafemann et al. | |
| 6,167,316 A | 12/2000 | McLaughlin et al. | |
| 6,178,393 B1 | 1/2001 | Irvin | |
| 6,195,591 B1 | 2/2001 | Nixon et al. | |
| 6,201,996 B1 * | 3/2001 | Crater et al. | 700/9 |
| 6,288,650 B2 * | 9/2001 | Chavand | 340/679 |
| 6,298,454 B1 | 10/2001 | Schleiss et al. | |
| 6,366,272 B1 | 4/2002 | Rosenberg et al. | |
| 6,385,496 B1 | 5/2002 | Irwin et al. | |
| 6,415,418 B1 | 7/2002 | Gloudeman et al. | |
| 6,442,512 B1 | 8/2002 | Sengupta et al. | |
| 6,442,515 B1 | 8/2002 | Varma et al. | |
| 6,445,963 B1 | 9/2002 | Blevins et al. | |
| 6,449,624 B1 | 9/2002 | Hammack et al. | |
| 6,477,435 B1 | 11/2002 | Ryan et al. | |
| 6,505,519 B2 | 1/2003 | Henry et al. | |
| 6,510,351 B1 | 1/2003 | Blevins et al. | |
| 6,515,683 B1 | 2/2003 | Wright | |
| 6,522,934 B1 | 2/2003 | Irwin et al. | |
| 6,546,297 B1 | 4/2003 | Gaston et al. | |
| 6,577,908 B1 | 6/2003 | Wojsznis et al. | |
| 6,587,108 B1 | 7/2003 | Guerlain et al. | |
| 6,615,090 B1 | 9/2003 | Blevins et al. | |
| 6,618,630 B1 | 9/2003 | Jundt et al. | |
| 6,618,745 B2 | 9/2003 | Christensen et al. | |
| 6,633,782 B1 | 10/2003 | Schleiss et al. | |
| 6,647,315 B1 | 11/2003 | Sherriff et al. | |
| 6,684,385 B1 | 1/2004 | Bailey et al. | |
| 6,687,698 B1 | 2/2004 | Nixon et al. | |
| 6,704,737 B1 | 3/2004 | Nixon et al. | |
| 6,711,629 B1 | 3/2004 | Christensen et al. | |
| 6,754,885 B1 * | 6/2004 | Dardinski et al. | 717/113 |
| 6,795,798 B2 | 9/2004 | Eryurek et al. | |
| 6,804,636 B2 | 10/2004 | Senta et al. | |
| 6,981,424 B2 | 1/2006 | Henry et al. | |
| 7,050,863 B2 | 5/2006 | Mehta et al. | |
| 7,065,476 B2 | 6/2006 | Dessureault et al. | |
| 7,089,530 B1 * | 8/2006 | Dardinski et al. | 717/105 |
| 7,096,465 B1 * | 8/2006 | Dardinski et al. | 717/178 |
| 7,110,835 B2 | 9/2006 | Blevins et al. | |
| 7,113,834 B2 | 9/2006 | Wojsznis et al. | |
| 7,219,306 B2 | 5/2007 | Kodosky et al. | |
| 7,317,959 B2 * | 1/2008 | Pfander et al. | 700/97 |
| 7,502,656 B2 * | 3/2009 | Thibault et al. | 700/83 |
| 7,516,052 B2 * | 4/2009 | Hatcherson et al. | 703/6 |
| 7,555,471 B2 * | 6/2009 | Hogue et al. | 706/48 |
| 7,593,780 B2 * | 9/2009 | Mann et al. | 700/17 |
| 7,647,126 B2 * | 1/2010 | Blevins et al. | 700/49 |
| 7,783,370 B2 * | 8/2010 | Nixon et al. | 700/83 |
| 7,912,799 B2 | 3/2011 | Abnous et al. | 706/45 |
| 7,971,052 B2 * | 6/2011 | Lucas et al. | 713/100 |
| 7,971,151 B2 * | 6/2011 | Nixon et al. | 715/771 |
| 8,060,222 B2 * | 11/2011 | Eldridge et al. | 700/83 |
| 8,065,110 B2 * | 11/2011 | Golineaux et al. | 702/181 |
| 8,261,595 B2 * | 9/2012 | Szepek et al. | 73/46 |
| 2002/0010571 A1 | 1/2002 | Daniel et al. | |
| 2002/0111783 A1 | 8/2002 | Kodosky et al. | |
| 2003/0074164 A1 * | 4/2003 | Simmons et al. | 703/1 |
| 2003/0188830 A1 * | 10/2003 | Narendrnath et al. | 156/345.51 |
| 2003/0200062 A1 | 10/2003 | Dessureault et al. | |
| 2004/0032433 A1 | 2/2004 | Kodosky et al. | |
| 2004/0068529 A1 * | 4/2004 | Pai | 708/206 |
| 2004/0078182 A1 | 4/2004 | Nixon et al. | |
| 2005/0062677 A1 | 3/2005 | Nixon et al. | |
| 2005/0096872 A1 | 5/2005 | Blevins et al. | |
| 2005/0158701 A1 | 7/2005 | West | |

(56) References Cited

U.S. PATENT DOCUMENTS

| | | | |
|---|---|---|---|
| 2005/0164684 | A1 | 7/2005 | Chen et al. |
| 2005/0187717 | A1 | 8/2005 | Paxson et al. |
| 2005/0197786 | A1 | 9/2005 | Kataria et al. |
| 2006/0073013 | A1 | 4/2006 | Emigholz et al. |
| 2007/0156264 | A1 | 7/2007 | Schleiss et al. |
| 2008/0288089 | A1* | 11/2008 | Pettus et al. ............... 700/9 |
| 2009/0210814 | A1* | 8/2009 | Agrusa et al. ............ 715/772 |
| 2009/0222752 | A1* | 9/2009 | Wall et al. ............... 715/771 |
| 2009/0287321 | A1* | 11/2009 | Lucas et al. ............... 700/79 |
| 2012/0209542 | A1* | 8/2012 | Gysling ................... 702/48 |

FOREIGN PATENT DOCUMENTS

| | | |
|---|---|---|
| DE | 10011661 B4 | 9/2011 |
| EP | 0 813 129 | 5/1998 |
| EP | 1 204 033 | 5/2002 |
| EP | 1 284 446 | 2/2003 |
| GB | 2 328 523 | 2/1999 |
| GB | 2 348 020 | 9/2000 |
| GB | 2 371 884 | 8/2002 |
| GB | 2 446 343 A | 8/2008 |
| JP | 1-298389 | 12/1979 |
| JP | 60-075909 A | 4/1985 |
| JP | 1-120593 | 5/1989 |
| JP | 2-310602 | 12/1990 |
| JP | 3-257509 | 11/1991 |
| JP | 5-54277 | 3/1993 |
| JP | 6-26093 | 2/1994 |
| JP | 7-036538 | 2/1995 |
| JP | 7-248941 | 9/1995 |
| JP | 8-314760 | 11/1996 |
| JP | 9-134213 | 5/1997 |
| JP | 9-330013 | 12/1997 |
| JP | 11-007315 | 1/1999 |
| JP | 2000-047860 | 2/2000 |
| JP | 2000-050531 | 2/2000 |
| JP | 2000-148226 A | 5/2000 |
| JP | 2000-242323 A | 9/2000 |
| JP | 2000-243323 A | 9/2000 |
| JP | 2000-266213 A | 9/2000 |
| JP | 2000-292584 A | 10/2000 |
| JP | 2000-311004 | 11/2000 |
| JP | 2000-346299 A | 12/2000 |
| JP | 2001-273006 A | 10/2001 |
| JP | 2002-140114 | 5/2002 |
| JP | 2002-189503 A | 7/2002 |
| JP | 2002-215221 | 7/2002 |
| JP | 2002-242323 A | 8/2002 |
| JP | 2002-258936 | 9/2002 |
| JP | 2002-303564 | 10/2002 |
| JP | 2004-199656 A | 7/2004 |
| JP | 2003-34629 A | 9/2004 |
| JP | 9-288512 | 11/2007 |
| WO | WO-97/38362 | 10/1997 |
| WO | WO-97/45778 | 12/1997 |
| WO | WO-2007/067645 | 6/2007 |

OTHER PUBLICATIONS

Japanese Office Action dated Sep. 4, 2007 in Japanese related patent application No. 2003-358631 (3 pages).
"Powerful Solutions for Digital Plants", Mimic Simulation v2.6, Mynah Technologies 2003, pp. 1-15.
Bailey, "Introducing Bailey Evolution 90™ . . . The Sound Investment Strategy for Process Automation", 1993.
Bailey, "Wide-Range, Fully Compatible Family of Process Automation and Management Systems", 1993.
Computer Products, "Unbundling the DCS", approximately 1992.
Elsag Bailey, "Elsag Bailey Automation", approximately 1993.
Fisher-Rosemount, "Managing the Process Better", Dec. 1993.
Fisher-Rosemount, "Managing the Process Better", Sep. 1993.
Honeywell, "Process Manager Specification and Technical Data", Sep. 1991.
Honeywell, "TDC 3000 Overview", approximately 1992.
Honeywell, "TDC 3000 Process Manager", approximately 1992.
Honeywell, "UDC 6000 Process Controller", Aug. 1992.
Leeds and Northrup, "Make Your Automation Plan a Reality: MAX 1000", approximately 1990.
Notice of Reason for Rejection, issued in corresponding Japanese Application No. 2003-358631 dated Jan. 16, 2007.
Reliance Electric Company, "Multitasking Capability Simplifies Process Control Design", approximately late 1980s, by Angelo J. Notte.
Toshiba, "Toshiba Integrated Control Systems", Nov. 1990.
Notice of Rejection for Japanese Application No. 2003-362187, dated Nov. 2, 2009.
Alsop et al., "What Dynamic Simulation Brings to a Process Control Engineer: Applied Case Study to a Propylene/Propane Splitter," URL:http://www.aspentech.com/publication_files/ertc2004_alsop_ferrer.pdf.
Chinese Office Action for Application No. 2003101027291, dated Jun. 21, 2007.
Chinese Office Action for Application No. 2003101027291, dated Nov. 19, 2010.
Chinese Rejection Decision for Application No. 2003101027291, dated Feb. 5, 2010.
Combined Search and Examination Report for Application No. GB 0514158.5, dated Dec. 23, 2005.
Combined Search and Examination Report for Application No. GB 0514161.9, dated Jan. 10, 2006.
Combined Search and Examination Report for Application No. GB 0514164.3, dated Dec. 23, 2005.
Examination Report for Application No. GB0719214.9, dated Mar. 4, 2010.
Examination Report for Application No. GB0719214.9, dated Aug. 10, 2010.
Examination Report for Application No. GB0719214.9, dated Sep. 9, 2009.
Invensys Process Systems News, Invensys Introduces Enhanced Foxboro Engineering and Operations for the I/A Series Automation System, (2002): Retrieved from the Internet on May 28, 2010: URL:http://www.automation.com/smc/print.php?stripImages=no.
Nahavandi et al., "A Virtual Manufacturing Environment with an Element of Reality," *Advanced Factory Automation, Conf.* Pub. 398: 624-629 (1994).
Notice of Rejection for Japanese Application No. 2000-134873, dated Feb. 3, 2004.
Notice of Rejection for Japanese Application No. 2003-362187, dated Sep. 6, 2010.
Office Action for U.S. Appl. No. 11/537,975, dated Jul. 8, 2009.
Ohmura, "Dynamic Simulator Visual Modeler," pp. 20-27 (1998).
Podesta et al., "Virtual Instrumentation for the Management, Simulation and Control of an In House Power Plant," IEEE Instrumentation and Measurement Technology Conference, pp. 1104-1106 (1996).
PSS 21S-2B8 B4, FoxView Software, pp. 1-12 (2005).
Search Report for Application No. GB0719214.9, dated Feb. 12, 2008.
Search Report for Application No. GB 0010850.6, dated Sep. 5, 2000.
Search Report for Application No. GB 0324470.4, dated Mar. 25, 2004.
Search Report for Application No. GB 0324633.7, dated Mar. 30, 2004.
UPID Brochure, Cutler Technology Corporation, URL:http://www.culter-tech.com.
German Office Action for Application No. 10348563.5-55.
Magin, "Digitale Prozessleittechnik," 1st Edition, Vogel Publishing, pp. 145-153 (1987).
Questioning for Japanese Patent Application No. 2003-362187 issued Feb. 14, 2012.
Notice of Reasons for Rejection for Japanese Application No. 2011-27092, dated Nov. 13, 2012.
Japanese Office Action (notice of reasons for rejection) for 2010-108486 dated Feb. 28, 2012.

(56) References Cited

OTHER PUBLICATIONS

Second Office Action for Chinese Application No. 200710164172.2, dated Jun. 5, 2012.
Notice of Reasons for Rejection for Japanese Application No. 2007-258407 mailed May 22, 2012.
German Office Action for Application No. 103 48 564.3, issued on Jul. 16, 2012.
Notice of Reasons for Rejection for Japanese Application No. 2010-108486, dated Jan. 7, 2013.
Yumoto, "Evolving Dynamic Simulator: Visual Modeler," *Separation Technology*, 6(6):367-372 (1999).
Notice of Reasons for Rejection for Japanese Application No. 2012-195268, dated Aug. 13, 2013.
Notice of Reasons for Rejection for Japanese Application No. 2012-183410, dated Jul. 23, 2013.

\* cited by examiner

SMART PROCESS MODULES AND OBJECTS IN PROCESS PLANTS

RELATED APPLICATION

This application is a continuation of U.S. patent application Ser. No. 10/278,469 filed Oct. 22, 2002, entitled "Smart Process Modules and Objects in Process Plants," the entire disclosure of which is hereby expressly incorporated by reference herein.

TECHNICAL FIELD

The present invention relates generally to process plants and, more particularly, to an intelligent operator environment that enables viewing and device condition detection functionality at the system level of a distributed control process plant.

DESCRIPTION OF THE RELATED ART

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Fisher-Rosemount Systems, Inc. includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol, which perform functions within the control scheme based on inputs thereto and which provide outputs to other function blocks within the control scheme. The configuration application may also allow a designer to create or change operator interfaces which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the save workstation as the configuration application.

As noted above, operator display applications are typically implemented on a system wide basis in one or more of the workstations and provide preconfigured displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally preconfigured to display, in known manners, information or data received from the process control modules or the devices within the process plant. In some known systems, displays are created through the use of objects that have a graphic associated with a physical or logical element and that is communicatively tied to the physical or logical element to receive data about the physical or logical element. The object may change the graphic on the display screen based on the received data to illustrate, for example, that a tank is half full, to illustrate the flow measured by a flow sensor, etc. While the information needed for the displays is sent from the devices or configuration database within the process plant, that information is used only to provide a display to the user containing that information. As a result, all information and programming that is used to generate alarms, detect problems within the plant, etc. must be generated by and configured within the different devices associated with the plant, such as controllers and field devices during configuration of the process plant control system. Only then is this information sent to the operator display for display during process operation.

While error detection and other programming is useful for detecting conditions, errors, alarms, etc. associated with control loops running on the different controllers and problems within the individual devices, it is difficult to program the process plant to recognize system-level conditions or errors that must be detected by analyzing data from different, possible diversely located devices within the process plant. Still further, operator displays have typically not been used to indicate or present such system-level condition information to operators or maintenance personnel and, in any event, it is difficult to animate objects within operator displays with these alternate sources of information or data for the different elements within the display. Moreover, there is currently no organized manner of detecting certain conditions within a plant, such as flow conditions and mass balances, as materials move through a plant, much less an easily implementable system for performing these functions on a system-level basis.

SUMMARY

An operator workstation or other computer runs an execution engine that executes process flow modules made up of interconnected smart process objects, each of which displays information about a particular entity within the process and which may include behavior or methods that can be used to detect conditions within the plant. The process flow modules may also include behavior or methods, called flow algorithms, that can be used to detect process conditions, especially on a system-level basis. The smart process objects may include a display element to be displayed to the operator, data storage for storing data pertaining to and received from an associated entity within a plant, inputs and outputs for communicating with other smart process objects and methods that may be executed on the stored and received data to detect plant or device conditions, such as leaks, errors and other conditions. The smart process objects may be communicatively connected together to create a process flow module that provides a display for, and implements a set of rules for a plant entity, such as an area, device, element, module, etc.

In one embodiment, each smart process object is associated with a plant entity, such as a field device, controller, or logical element, and includes a data store for parameter or variable data associated with that entity. The smart process object is communicatively coupled to the entity, either directly or through a configuration database, to receive data associated with that entity. Each smart process object may also be communicatively coupled to other smart process objects within the operator interface to send data to and receive data from the other smart process objects and may include methods or routines for operating on the data available to the smart process object to detect conditions associated with the device or plant. For example, a smart process object for a tank may be coupled to smart process objects for pumps or flow transmitters upstream and downstream of the tank and receive data indicative of the upstream and downstream flows into and out of the tank. A method associated with the tank object may detect leaks in the tank by comparing the level of the tank with the expected level in the tank based on the flows into and out of the tank. Still further, the process flow modules may include flow algorithms that can be implemented on the combination of entities therein to detect system-level conditions, for example, to detect mass balances, flow conditions, etc.

The smart process objects and process flow modules enable the implementation of condition and error detection routines at the operator display device, and may work together with or eliminate the need to provide this functionality down within the controller and field devices of the plant. These smart process objects and process flow modules also provide the operator with another degree of programming flexibility within the process plant that can be used to provide better and more complete information to the operator while still being easy to use and implement. Still further, the operator displays may be animated with information determined by or calculated by flow algorithms of the process flow modules.

DESCRIPTION OF THE PREFERRED EMBODIMENTS

Figure 1:
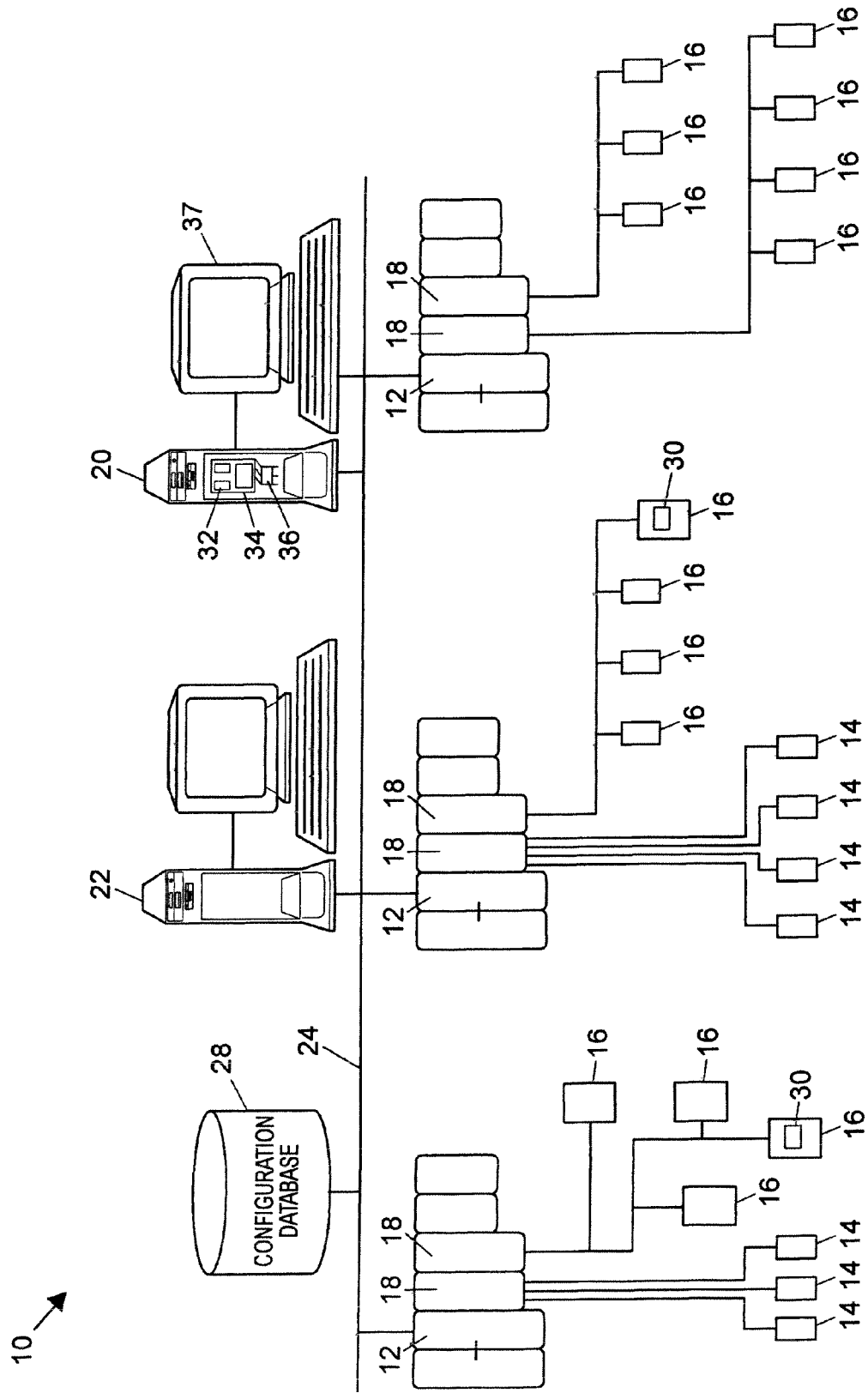
FIG. 1 is a block diagram of a distributed process control network located within a process plant including an operator workstation that implements a display routine which uses smart process objects and process flow modules to analyze the process plant.

Referring now to FIG. 1, a process plant 10 uses a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20 and 22 via a data highway 24 which may be, for example, an Ethernet link. Furthemnore, a database 28 may be connected to the data highway 24 and operates as a data historian that collects and stores parameter status and other data associated with the controllers and field devices within the plant 10 and/or as a configuration database that stores the current configuration of the process control system within the plant 10 as downloaded to and stored within the controllers 12 and field devices 14 and 16. While the controllers 12, input/output cards 18 and field devices 14 and 16 are typically located down within and distributed throughout the sometimes harsh plant environment, the operator workstations 20 and 22 and the database 28 are usually located in control rooms or other less harsh environments easily assessable by controller or maintenance personnel.

As is known, each of the controllers 12, which may be by way of example, the DeltaV controller sold by Fisher-Rosemount Systems, Inc., stores and executes a controller application that implements a control strategy using a number of different, independently executed, control modules or blocks. The control modules may each be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed using function block or any other particular programming technique.

In the system illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of device. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules within the controllers 12 to implement process control, as is well known. Of course, the field devices 14 and 16 (may be any types of devices, such as sensors, valves, transmitters, positioners, etc. and the PO devices 18 may be any types of PO devices conforming to any desired communication or controller protocol such as HART, Fieldbus, Profibus, etc.

In the process plant 10 of FIG. 1, the workstation 20 includes a suite of operator interface applications and other data structures 32 which can be accessed by any authorized user (referred to herein as an operator) to view and provide functionality with respect to devices connected within the process plant 10. The suite of operator interface applications 32 is stored in a memory 34 of the workstation 20 and each of the applications or entities within the suite of applications 32 is adapted to be executed on a processor 36 associated with the workstation 20. While the entire suite of applications 32 is illustrated as being stored in the workstation 20, some of these applications or other entities could be stored in an executed in other workstations or computer devices within or associated with the plant 10. Furthermore, the suite of applications can provide display outputs to a display screen 37 associated with the workstation 20 or any other desired display screen or display device, including hand-held devices, laptops, other workstations, printers, etc. Likewise, the applications within the suite of applications 32 may be broken up and executed on two or more computers or machines and be configured to operated in conjunction with one another.

Figure 2:
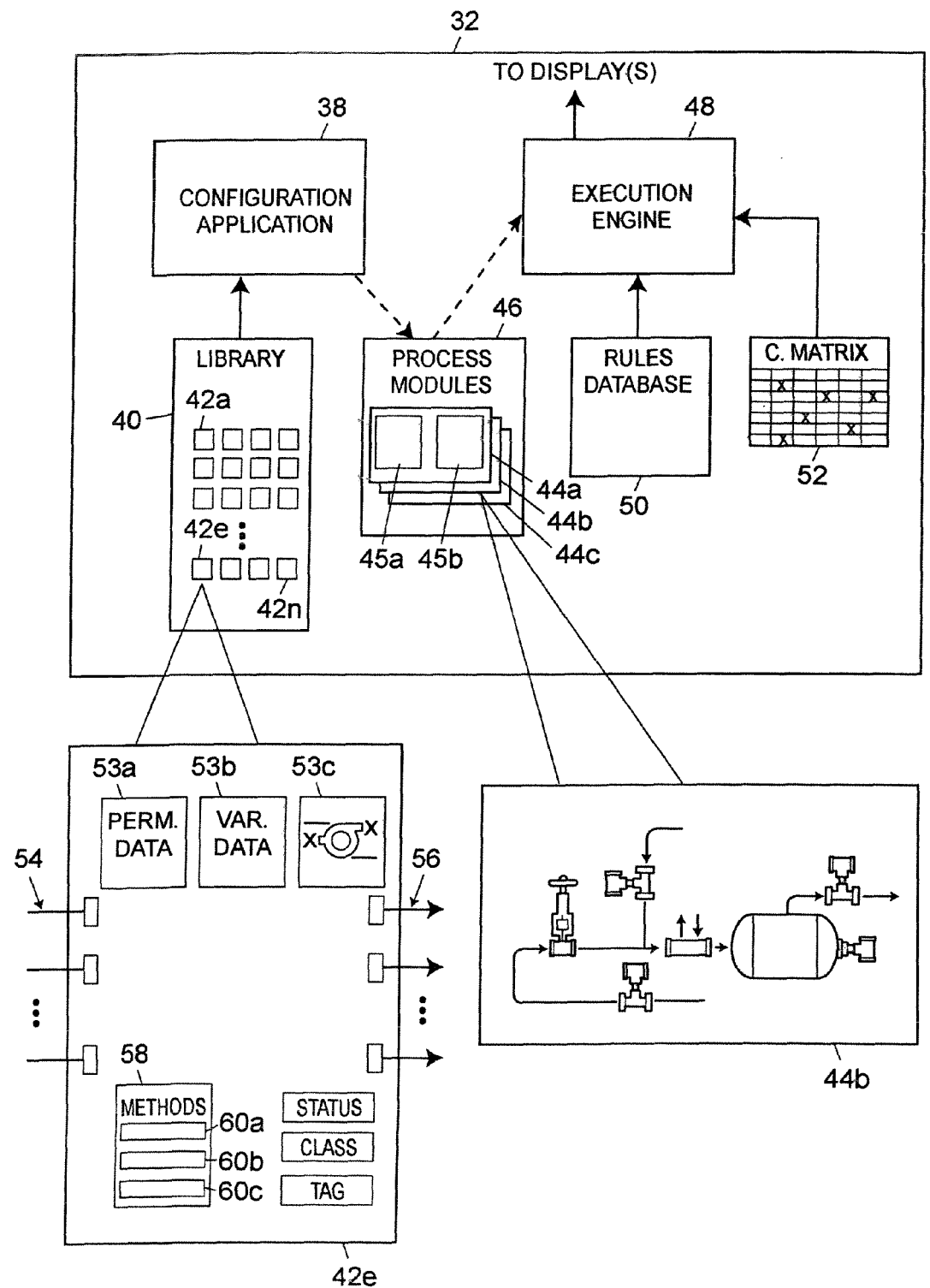
FIG. 2 is a logical block diagram of a set of applications and other entities, including smart process objects and process flow modules, stored in the operator workstation of FIG. 1, which may be used to implement enhanced functionality in a process plant.

FIG. 2 illustrates some of the applications and data structures or other entities within the suite of applications (and other entities) 32 of the workstation 20. In particular, the suite of applications 32 includes a process flow module configuration application 38 which is used by an operator to create process flow modules (and associated displays) using one or more smart process objects. A library 40 of smart process objects 42 includes example or template smart process objects that may be accessed, copied and used by the configuration application 38 to create process flow modules 44. As will be understood, the configuration application 38 may be used to create one or more process flow modules 44, each of which is made up of one or more smart process objects and may include one or more process flow algorithms 45, which are stored in a process flow module memory 46. One of the process flow modules 44*b* is illustrated in FIG. 2 in expanded form and includes a set of process elements, such as valves, tanks, sensors and flow transmitters, interconnected by connections elements which may be pipes, conduit, wires, conveyors, etc.

An execution engine 48 operates or implements each of the process flow modules 44 during runtime to create one or more process displays for an operator as defined by the process flow modules 44 and to implement additional functionality associated with the process flow modules 44 and with the smart process objects within the process flow modules 44. The execution engine 48 may use a rules database 50 defining the logic to be implemented on the process flow modules 44 as a whole and the smart process objects within those modules in particular. The execution engine 48 may also use a connection matrix 52 which defines the connections between the process elements within the plant 10 as well as within the process flow modules 44 to implement the functionality for the process flow modules 44.

FIG. 2 illustrates one of the smart process objects 42*e* in more detail. While the smart process object 42*e* is illustrated as being one of the template smart process objects, it will be understood that other smart process objects will generally include the same or similar elements, features, parameters, etc. as described with respect to the smart process object 42*e* and that the specifics or values of these elements, features and parameters may be changed or varied from smart process object to smart process object depending on the nature and use of that smart process object. Furthermore, while the smart process object 42*e* may be an object within an object oriented programming environment and thus include data stores, inputs and outputs and methods associated therewith, this smart process object may be created by and implemented within any other desired programming paradigm or protocol.

As will be understood, the smart process object 42*e* is an object that is associated with a particular entity, such as a physical or a logical entity, within the process plant 10 of FIG. 1. The smart process object 42*e* includes a data store 53 that is used to store data received from or pertaining to the logical entity with which the smart process object 42*e* is associated. The data store 53 generally includes a data store 53*a* that stores general or permanent information about the entity to which the smart process object 42*e* pertains, like manufacturer, revision, name, type, etc. A data store 53*b* may store variable or changing data, such as parameter data, status data, input and output data, or other data about the entity to which the smart process object 42*e* pertains including data associated with the entity as it has existed in the past or as it now exists within the process plant 10. Of course, the smart process object 42*e* may be configured or programmed to receive this data on a periodic or non-periodic basis, from the entity itself via any desired communication link, from the historian 28 via the Ethernet bus 24 or it any other desired manner. A data store 53*c* may store a graphical representation of the entity to which the smart process object 42*e* pertains and which is used for actual display to the operator via an operator interface, such as the screen 37 associated with the workstation 20 of FIG. 1. Of course, the graphical representation may include place holders (marked by underlines within the data store 53*c*) for information about the entity, such as information defined by the parameter or other variable data about the entity as stored in the data store 53*b*. This parameter data may be displayed in the graphical place holders when the graphical representation is presented to the operator on a display device 37. The graphical representation (and the smart process object 42*e*) may also include predefined connection points (marked by an "X" in the data store 53*c*) that enable an operator to attach upstream or downstream components to the process element, as depicted by the graphical representation. Of course, these connection points also enable the smart process object 42*e* to be aware of the elements connected to that smart object as configured within a process flow module.

The smart process object 42*e* may also include one or more inputs 54 and outputs 56 to enable communication with other smart process objects within or outside of a process flow module in which the smart process object 42 is placed. The connections of the inputs 54 and outputs 56 to other smart process objects may be configured by an operator during configuration of a process flow module by simply connecting other smart process objects to these inputs and outputs or by specifying particular communications that are to take place between smart process objects. Some of these inputs and outputs may be defined as being connected to the smart process objects connected at the predefined connection points for the smart process object as discussed above. These inputs 54 and outputs 56 may also be determined or defined by a set of rules within the rule database 50 and the connection matrix 52 defining the connections between different devices or entities within the plant 10. The inputs 54 and the outputs 56, which include data stores or buffers associated therewith will, generally speaking, be used to provide communications of data from other smart process objects to the smart process object 42*e* or to provide communications of data stored within or generated by the smart process object 42*e* to other smart process objects. These inputs and outputs may also be used to provide communications between the smart process object 42*e* and other objects within the process control system, Such as control modules within the controllers 12, field devices 14, 16, etc.

As illustrated in FIG. 2, the smart process object 42*e* also includes a method storage 58 that is used to store zero, one or more methods 60 (illustrated as methods 60*a* 60*b* and 60*c* in FIG. 2) to be implemented by the smart process object 42*e* during execution of a process flow module by the execution engine 48. Generally, the methods 60 stored in the method storage 58 will use the data stored within the data storage portions 53*a* and 53*b* and data obtained from other smart process objects or even data from other sources, such as the configuration database or historian 28, via the inputs 54 and the outputs 56 to determine information about the process plant 10 or an entity within the plant 10. For example, the methods 60 may determine poor or bad operating conditions associated with the entity defined by the smart process object 42*e*, errors associated with that or other entities within the process plant 11, etc. The methods 60 may be preconfigured or provided based on the type or class of smart process object and will generally be executed each time the smart process object 42*e* is executed within the execution engine 48 during runtime. Some example methods 60 that may be provided within a smart process object, such as the smart process object 42*e*, include detecting leaks, dead band, dead time, movement, variability, condition monitoring, or other conditions associated with the entity. The methods 60 may also be provided to help calculate mass balances, flows and other system-level conditions associated with the plant 10. Of course, these are but a few of the methods that can be stored in and run by a smart process object, and there are many other methods that may be used, with such methods generally being determined by the type of entity being represented, the manner in which that entity is connected in and used in a process plant as well as other factors. While the smart process object 42*e* may store and execute methods that detect system-level conditions, errors, etc., these methods may also be used to determine other information about devices, logical elements, such as process control modules and loops, and other non-system-level entities. If desired, the methods 60 may be programmed or provided in any desired programming language, such as C, C++, C#, etc. or may be references to or may define applicable rules within the rule database 50 that should be run for the smart process object 42*e* during execution.

During execution of the smart process object by the execution engine 48, the engine 48 implements the communications defined by the inputs 54 and outputs 56 to each of the smart process objects in a process flow module 44 and may implement the methods 60 for each of those objects to perform the functionality provided by the methods 60. As noted above, the functionality of the methods 60 may be located in programming within the smart process object or defined by a set of rules within the rule database 50 that the engine 48 executes, based on the type, class, identification, tag name, etc. of a smart process object, to implement the functionality defined by those rules.

It will be noted that the smart process object 42*e* has a tag or unique name associated therewith that may be used to provide communications to and from the smart process object 42*e* and to be referenced by the execution engine 48 during runtime. Still further, the parameters of the smart process object 42*e* can be simple parameters, such as simple values, or smart parameters that know the expected units associated therewith. Smart parameters can be interpreted and used by the process rules engine or execution engine 48 to assure all signals are being sent in the same units or are converted properly. Smart rules can also be used to turn on and turn off groups of alarms for the smart process objects (or process flow modules) to create a smart alarm strategy and/or interface for the operator. Still further, smart process object classes can be associated with equipment and module classes within the process control strategy of the plant 10 to provide a known linkage between a smart process object and the process variables it will need to interpret or access.

Smart process objects may also include mode, status, and alarm behavior so that these smart objects may be put in different modes during runtime, such as manual, cascade or automatic modes, may provide a status associated with the object based on its current operating state, and may provide alarms based on detected conditions, such as a parameter out of range, limited, high variability, etc. Smart process objects may also have a class/subclass hierarchy which enables them to be categorized in class libraries, to be collected together in a composite structure, etc. Still further, smart process objects may be acquired and released by other elements, such as control modules and other objects to enable the smart process object to recognize when its associated entity is busy or, for example, acquired by a batch control process within the plant 10.

Smart process objects may be associated with any desired process entity, such as physical devices like pumps, tanks, valves, etc., or logical entities such as process areas, process loops, process control elements like process control modules, etc. In some cases, smart process objects may be associated with connectors, such a piping, conduit, wiring, conveyors belts, or any other device or entity that moves material, electricity, gas, etc. from one point to another point within the process. Smart process objects that are associated with connectors, referred to herein as smart links, are also tagged (even tagged the device or connector itself may not be tagged or able to communicate within the process plant 10), are generally used to represent process flow between smart process objects.

Smart links will typically include properties or parameters that define how different materials or phenomena (such as electricity) flow through the connection (e.g. steam, electricity, water, sewage, etc.) These parameters may indicate the type and nature of flow (such as the general speed, friction coefficients, type of flow like turbulent or non-turbulent, electromagnetic, etc.) through the connector and the possible direction or directions of flow through the connector. Smart links may include programming or methods that ensure that the units of the source and destination object to which the smart link connects, match and, if not, may perform a conversion. The methods of the smart link may also model the flow through the connector using a model or an algorithm to estimate the speed or nature of the flow through the actual connectors. The stored parameters for the smart process object (such as friction parameters) may be used in these methods. Thus, in essence, the smart links enable smart process objects to be aware of the other objects upstream and downstream of them. Of course, smart links may, for example, define the connections between other objects, the type of fluid, such as liquid, gas, electricity, etc. within the system, the upstream and downstream side of the entities, which other entities are upstream and downstream of the entity for this smart process object, the direction of material, fluid, electric flow, etc. in any desired or convenient manner. In one embodiment, the matrix 52 may be created prior to execution of process flow modules and may define for the smart links the interconnections between the different devices within the plant and, therefore, the interconnections between the different smart process objects. In fact, the execution engine 48 may use the matrix 52 to ascertain the upstream and downstream entities and thereby define the communications between the smart process objects and the methods associated with the smart process objects. Still further, one or more sets of rules may be provided to be used by the smart process objects to interact with each other and to obtain data from each other as needed for the methods within the smart process objects.

If desired the smart process object 42e may provide hot links, such as URLs, to key documentation which may be applicable to the type of object, or which may be specific to the instance (depending on the criticality) of the device to which the smart process object 42e pertains. The documentation maybe vendor supplied as well as user-specific. Some examples of documentation include configuration, operational and maintenance documentation. If desired, an operator may click on the object as displayed in an operator display to bring up the instance specific (if any) and generic documentation for the object or associated device. Also, the operator may be able to add/delete/change documentation independently of the system software Furthermore, these hot links may be user configurable or changeable to provide the ability to add knowledge links to objects in the operator interface, to provide for quick navigation to appropriate information associated with the object and to provide the ability to add work instructions specific to the customer, or specific to the object type or even specific to the instance of the object.

Figure 3:
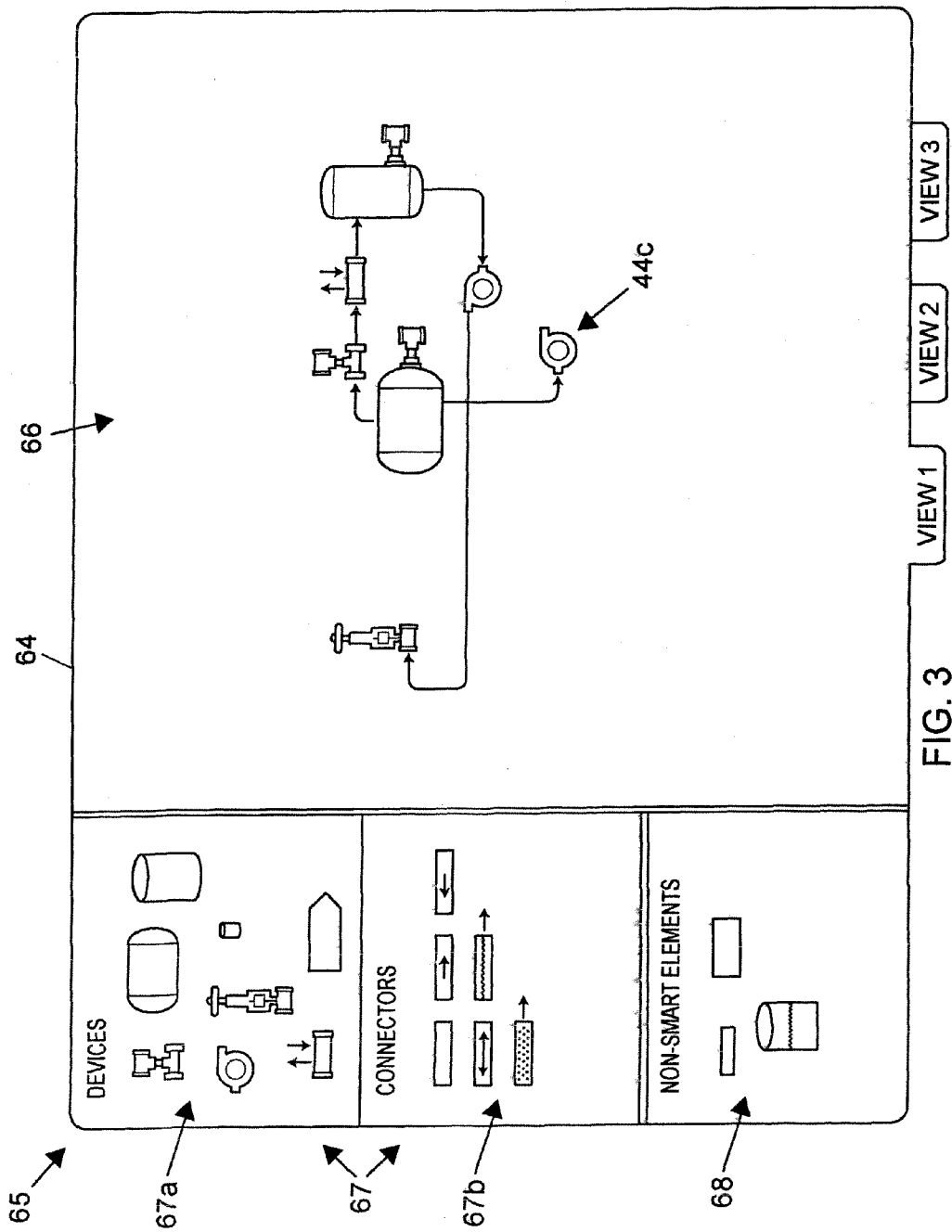
FIG. 3 is a depiction of a configuration screen used by an operator to create a process display using smart process objects stored in an object library.

Generally speaking, an operator may run or execute the configuration application 38 to create one or more process flow modules 44 for implementation during operation of the process 10. In one embodiment, the configuration application 38 presents a configuration display, such as that illustrated in FIG. 3, to the operator. As seen in FIG. 3, a configuration display 64 includes a library or template section 65 and a configuration section 66. The template section 65 includes a depiction of sets of template smart process objects 67 (which may include the smart process objects 42 of FIG. 2) and non-smart elements 68. Essentially, the templates 67 and 68 are generic objects that may be dragged and dropped onto the configuration section 66 to create an instance of a smart process object within a process flow module. A partially completed process flow module 44c is illustrated as including a valve, two tanks, two pumps, a flow transmitter and two sensors interconnected by flow path connectors, which may be smart links. It will be noted that the process flow module 44c may be made up of both smart process objects and non-smart elements.

When creating a process flow module, such as the process flow module 44c, the operator may select and drag the smart process objects 67 and the elements 68 illustrated in the template section 65 onto the configuration section 66 and drop them there in any desired location. Generally, the operator will select and drag one or more smart device process objects 67a or non-smart elements 68 depicting devices onto the configuration section 66. The operator will then interconnect the smart device process objects and non-smart device elements depicted within the configuration section 66 with smart connector process objects 67b or non-smart elements 68 depicting connectors. The operator may change the properties of each of the smart process objects and non-smart elements during this process using pop-up properties menus, etc. and, in particular, may change the methods, parameters, tags, names, hot links, modes, classes, inputs and outputs, etc. associated with these smart process objects. When the operator has created a process flow module with each of the desired elements, typically representing a process configuration, area, etc., the operator may define rules or other functionality associated with the module. Such rules may be execution rules such as those associated with the performance of system-level methods, like mass balance and flow calculations which are to be performed during operation of the module 44c. After creating the module 44c, the operator may save that module in the module memory 46 of FIG. 2 and may at that time, or later, instantiate and download that process flow module to the execution engine 48 in a manner that the execution engine 48 may operate the process flow module 44c.

If desired, the smart process objects within a process flow module may be provided a specific tag or may be provided with a tag including an alias that can be filled in or selected at runtime by, for example, the execution engine 48 based on other factors, such as a piece of equipment or a route selected within the process control system. The use of alias names and indirect referencing in process control systems is discussed in detail in U.S. Pat. No. 6,385,496, which is assigned to the assignee of the present invention and which is hereby expressly incorporated by reference herein. Any of these techniques may be used to provide and resolve aliases in tags for the smart process objects described herein. With the use of aliases and the like, the same process flow module may include or be used to support different views for sets of equipment, etc.

The display 64 of FIG. 3 illustrates tabs (View 1, View 2 and View 3) for different views of the process flow module 44c. These tabs may used to access and create different views associated with the process flow module 44c using some of the same smart process objects therein. The use of alias names in one or more of these views enables, for example, a routing executive or view which defines a route for process flow within the process plant during runtime to use the module 44c of View 1 even though different actual devices used within the route are specified after creation of the process flow module 44c. In effect, the smart process objects may be connected to and become associated with different process entities at different times during runtime. Thus, with the use of alias names, the process flow modules are not limited to static binding between the graphic user display and the process flow database. As an example, a view (such as View 2 of FIG. 3) may be associated with routing routine which may be used by an operator to select a route through different ones of the process entities. Upon selection of the route, thereby specifying specific process entities, the tag names or alias names in the other views may be filled in, thereby changing or specifying the behavior for these views.

Generally speaking, when the operator creates a process flow module, the configuration application 38 automatically stores the smart process objects, along with the connections therebetween, in a process flow database. This process flow database can then be used to create other process flow modules which may, for example, provide a different view using one or more of the same smart process objects. As such, when creating the second view, the operator can simply reference the smart process object, as already created and stored within the process flow database, and any methods, etc. stored therewith to place that smart process object in the second view. In this manner, the process flow database can be populated as the process control modules are created and the process flow database can be used at any time to create and execute other views, modules, and graphic displays using smart process objects which already exist within the process flow database. Using such a process flow database, each smart process object within the process flow database may support or be used in different process flow modules and in different views or displays for those process flow modules. As will also be understood, the process flow modules are constructed or built by building displays for these modules and then specifying flow algorithms to be used in or associated with these process flow modules. Of course, individual process flow modules may be spread across and executed by different computers and process flow modules may be communicatively connected to one other to operate in conjunction with each other, either on the same or on different computers.

As noted above, the operator may, as part of the process flow module creation or configuration process, attach or provide process flow algorithms to the process flow module. These process flow algorithms may be preconfigured to calculate or determine certain process or system-level properties, such as mass balance calculations, flow calculations, efficiency calculations, economic calculations, etc. with respect to the process depicted or modeled by the process flow module. As a result, the process flow modules themselves may have mode, status, and alarm behavior, can be assigned to workstations, and may be downloaded as part of the display downloads. If desired, the flow algorithms may be executed by a separate or different execution engine or by the execution engine 48 to perform mass or heat balancing, flow routing flow efficiency, flow optimization, economic calculations related to flow or other desired flow related calculations using the data provided in the smart process objects of the process flow module. Still further, these flow algorithms may access parameters from the control strategy, i.e., the control modules associated with and downloaded to the controllers, field devices, etc. and may, conversely, provide data or information to these control modules.

The execution of these flow algorithms may be enabled and disabled by the operator on a module by module basis at any given time. Likewise, the operation of these flow algorithms may be verified and debugged in any desired manner prior to the process flow module being downloaded to the execution engine 48. Similar to the smart process objects, the process flow modules or the flow algorithms associated therewith may be acquired and released by other entities within the process control system or plant 10. In order to take on this intelligent behavior, displays for the process flow modules may be built from display classes which can optionally have one or more of the process flow algorithms associated therewith. To engage a process flow algorithm the user may select the display and enable the special behavior (e.g. mass balance, flow calculation, etc.) which will take effect over the span of the smart process objects defined on the display. To perform this functionality, the process flow algorithms should be associated with a particular workstation which can be defined as a property of the display or display class.

It will be understood that the execution engine 48 is needed to enable the process flow algorithms to execute across an amalgamation of all process objects and links configured on all displays. Thus, the process flow algorithms will generally execute regardless of whether any display is loaded, i.e., called up and displaying information to a user. Of course, the process flow algorithms may be cross-checked across the entire process 10 or across defined subsets of the process 10. It will also be understood that, during execution of any particular process flow module, the execution engine 48 may provide a display to an operator on an operator interface depicting the interconnected objects or entities within the process flow module based on the graphical representations of the smart process objects and the non-smart elements within that process flow module. The parameters, graphics, etc. of the display will be determined by the configuration and interconnection of the smart and non-smart elements within the process flow module. Furthermore, alarms and other information to be provided on this or other displays will be defined and generated by the methods within the smart process objects a id the flow algorithms associated with a particular process flow module. If desired, the execution engine 48 may provide a display for a process flow module to more than one operator interface or may be configured or set to provide no display, even though the execution engine 48 continues to execute the process flow module and thereby perform the methods, alarm behavior, flow algorithms, etc. associated therewith.

Figure 4:
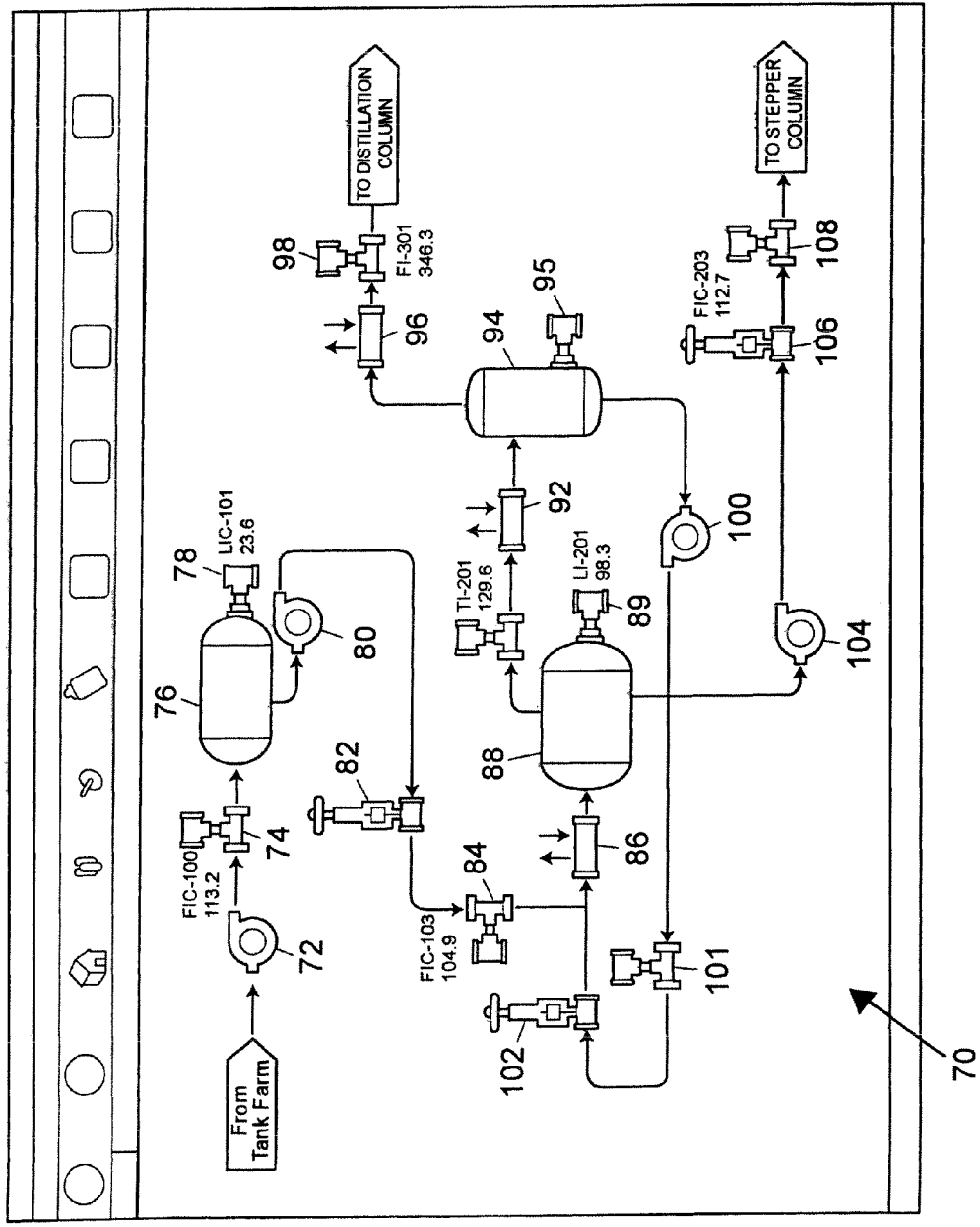
FIG. 4 is a screen display illustrating an operator interface generated by a process flow module using multiple smart process objects.

FIG. 4 illustrates an example screen display 70 that may be generated by the operator interface application 40 on the display 37 of the workstation 20 of FIG. 1. The screen display 70 includes a depiction of numerous process plant entities as set up and configured within, for example, the plant 10 of FIG. 1. In particular, fluid flow from a tank farm is provided to a pump 72 which pumps liquid through a flow transmitter 74 to a tank 76 having a measurement device, such as a level sensor/transmitter 78, attached hereto. A pump 80 pumps liquid from the tank 76 through a valve 82, a flow transmitter 84 and a heat exchanger 86 to a second tank 88 having a sensor/transmitter device 89 attached thereto. The tank 88 provides a first output through a flow transmitter 90 and a heat exchanger 92 to a third tank 94 having a measurement or sensor device 95 thereon. The tank 94 provides an output through a heat exchanger 96 and a flow transmitter 98 to a distillation column. The tank 94 also provides an output via a pump 100, a flow transmitter 101 and a valve 102 back to the input of the heat exchanger 86. Similarly, a second output of the tank 88 is pumped by a pump 104 through a valve 106 and a flow transmitter 108 to a stepper column. While the entities depicted in the screen display 70 include tanks, pumps, flow transmitters, valves, lines, etc., connected in a particular configuration, any other process entities, including hardware devices and software or logical elements such as control loops, control modules, function blocks, etc. may be depicted within the screen display 70 in any desired configuration. Still further any of the devices, such as the tanks, transmitters, valves, etc. as well as the connectors therebetween depicted on the screen 70 may be generated by or associated with smart process objects within a process flow module used to create the display 70 during runtime of that module.

As will be understood, at least some of the interconnected entities within the screen display 70 are configured using the configuration application 38 and may be displayed on the display screen 70 by the execution engine 48 during runtime of a process flow module based on the smart process objects and other elements within the process flow module being executed. For example, the tanks 76, 88 and 94, the flow transmitters 74, 84, 90, 98, 101 and 108 and the sensor/transmitter devices 78, 89 and 95 as well as one or more of the connectors connecting these elements may be generated on the display screen 70 by smart process objects associated therewith. Of course, only some of these entities need to have smart process objects associated therewith.

During operation of the execution engine 48, the smart process objects associated with the entities of module depicted in FIG. 4 obtain data from the actual hardware (or software) entities associated therewith and may, in some cases, display this data to the operator on the screen 70 as part of or as associated with graphical element of the smart process object. Example data displays are illustrated for the flow transmitters 74, 84, 90 and 98 as well as for the level sensors 78 and 89. Of course, certain ones of the smart process objects may be communicatively coupled together to send data to and obtain data from one another to be able to perform methods associated therewith. For example, the smart links may obtain data regarding flow, etc. from other ones of the smart process objects within the process flow module depicted in FIG. 4. As indicated above, the methods for the smart process objects may perform any desired functions on the data obtained by and sent to the smart process objects to detect operating or other conditions within the plant 10, including errors or other adverse (or potentially good) conditions associated with the process plant 10 or devices thereof.

In one example the tank 88, the sensor transmitter 89, which may be a level sensor, and the flow transmitters 84, 90, 101 and 108 (which are flow sensor devices) may each be associated with a different smart process object and be generated on the screen 70 using a smart process object. These smart process objects are communicatively tied to, and obtain data from the different devices with which they are associated. Thus, the smart process objects for the flow transmitters 84, 90, 101 and 108 obtain the readings of the flow through those actual devices as measured by those devices in the plant 10. Likewise, the smart process object for the sensor transmitter 89 is tied to and obtains the measurements made by the actual sensor pertaining to the level of the tank 88. Likewise, a smart process object for the tank 88 may be communicatively tied to each of the smart process objects for the flow transmitters 84, 90, 101 and 108 and the smart process object for the level sensor 89. The smart links connected to the tank 88 may specify the flow direction and upstream and downstream points associated with the flow transmitters 84, 90, 101 and 108. A method stored in or associated with the smart process object for the tank 88 may use the data from the smart process objects for the transmitters 84, 90, 101, 108 and 89 and the heat exchangers 86 and 92, to determine if the tank 88 is leaking or losing BTUs (heat balance calculations). This method may operate by first determining the (instantaneous, average, integral, etc.) flow into the tank 88 as the sum of the flows measured by the flow transmitters 84 and 101 and then determining the outflow from the tank as the Sum of the flows measured by the flow transmitters 90 and 108. The method may then determine the difference between these flows, as integrated over time, as the amount of fluid being added to (or subtracted from) the tank 88. The method may next ascertain if this change in the amount of fluid within the tank 88 over a particular amount of time is reflected by the difference in the level of the tank 88 as measured by the level sensor 89. If the level over the particular period of time, for example, increases less than expected, then the method associated with the tank 88 may detect and indicate to the operator that the tank 88 may be leaking fluid. Similarly, an increase in the level over the amount expected based on the obtained measurements may be used to detect or determine a faulty sensor or measurement device within this part of the plant 10. This technique can also be used to provide redundancy in measurements to, for example, cross check measurements or data with other related measurements thereby, in essence, making more measurements than absolutely required. Of course, any difference in the expected level and the measured level may be indicated to the operator as an error or an alarm, such as an advisory alarm.

In another example, a smart process object may be created and implemented for the pump 72 and the flow transmitter 74. The smart process object for the pump 72 may be aware that it is connected to equipment within the tank farm and to the flow transmitter 74 and may receive data from the smart process objects for these entities. A method associated with the smart process object for the pump 72 may receive the data from the smart process object for the flow transmitter 74 and determine the variability of the flow as measured by the flow transmitter 74. (If desired, a method associated with the smart process object for the flow transmitter 74 may determine the variability of that transmitter, or an application within the transmitter 74 itself may determine the transmitter variability and provide this determination as data to the smart process object for the transmitter 74.) In any event, if the variability for the transmitter 74 exceeds a certain limit, the method for the pump smart process object may notify the operator of the high variability using an alarm, such as an advisory alarm. Of course, these are only a couple of methods that may be implemented to perform functionality at the operator interface level to detect conditions, such as problems, errors, alarms, etc. within the plant 10 and other methods may be provided and used as well.

Still further, the execution engine 48 (which may have a separate execution engines for implementing displays and methods associated with smart process objects and for implementing flow algorithms associated with process flow modules) may implement flow algorithms associated with one or more process flow modules to calculate mass balances flows, etc. for the portion of the plant depicted by those modules. The execution engine 48 may, as part of this process, provide information or data to the other elements within the process plant 10, such as to process control modules running in the controllers 12 of the plant 10.

It will be understood that the functionality of the smart process objects and process flow modules operates in the operator workstation 20 and does not need to be downloaded to and configured within the controllers, field devices, etc. within the plant 10, which makes this functionality easier to implement, view, change, etc. Further, this functionality enables system level determinations to be made more easily than down within the process devices, controllers, etc. because the information pertaining to the devices on a system level is all typically available to the operator workstation 20 in general and to the execution engine 48 in particular whereas all of this information is not typically made available to each controller and field device within the process plant 10. However, when it is advantageous to do so, some of the logic associated with the process flow modules, such as primitives, may be embedded in the devices, equipment and controllers down within the process plant. The use of smart process objects enables the execution engine 48 to, for example, automatically detect leaks and produce alarms with no or only minimal amounts of user configuration activities, to calculate and track flow and mass balances within the plant 10, to track losses within the plant 10 and to provide higher level diagnostics for the plant 10.

If desired, methods or rules may be established generically and applied to the different smart process objects and process flow modules generally or on a system-wide basis to detect and track loses, flows, variability, etc. within the plant 10 as well as to provide alarming(, and other condition detection within the plant 10 based on the configuration of the plant 10 as reflected in the smart process objects and process flow modules. These rules may be applied based on the type and nature of the smart process objects, what material is supported, such as liquid, gas, electricity, etc. and the connections between the objects as defined by the connection matrix 52 described above or any other information defining the interconnections between the devices within the plant 10 and, therefore, the interconnections between the smart process objects.

Figure 5:
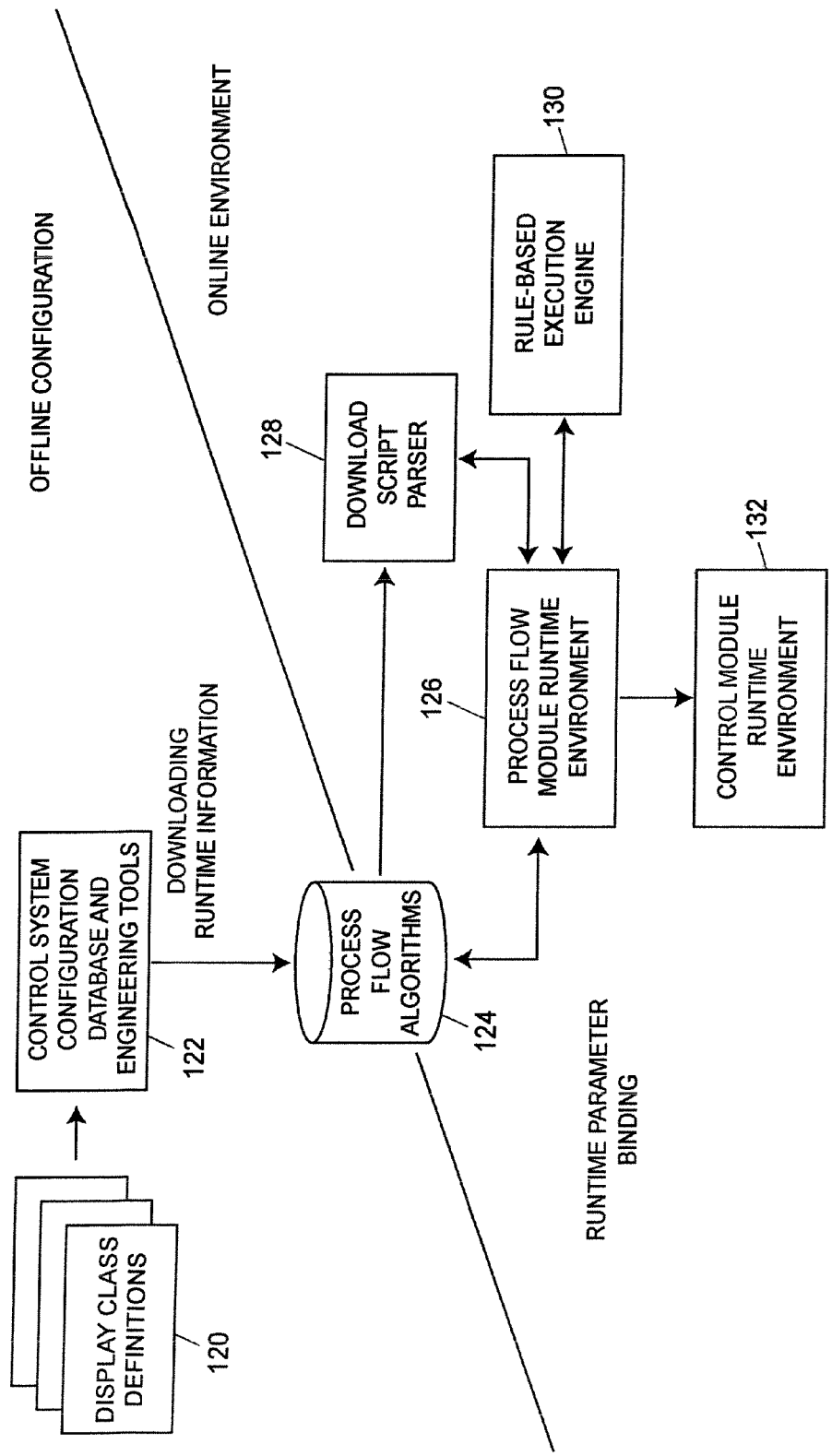
FIG. 5 is a logical block diagram of a manner in which process flow modules using smart process objects may be created in and implemented within an existing process control network.

FIG. 5 depicts one possible manner of integrating the execution engine 48 and process flow modules used thereby within a process plant have a distributed control strategy associated therewith. As illustrated in FIG. 5, the display class definitions 120 as created by the process flow modules for providing displays to an operator during execution by the execution engine 48 are provided to the control configuration database and engineering tools 122 which may use and organize these display class definitions in any desired manner within the control strategy documentation. Process flow algorithms 124 may be connected to these display class definitions prior to runtime and then the display class definitions and flow algorithms bound thereto are instantiated and provided to the process flow module runtime environment 126 (which may be implemented in the form of one or more execution engines 48 in different operator workstations). The process flow module runtime environment 126 uses a download script parser 128 to parse the code during execution (i.e., to perform just in time object code conversion) and uses a ruled-based execution engine 130 to execute flow algorithms or other rule based procedures provided for or bound to the display classes. During this process, the process flow module runtime environment 126 may communicate with the control module runtime environment 132, which may be executed in controllers and field devices associated with the process, to provide data or information to the control module runtime environment 132 or to access data or other information from the control module runtime environment 132. Of course, the process flow module runtime environment 126 may communicate with the control module runtime environment 132 using any desired or preconfigured communication networks, such as the Ethernet bus 24 of FIG. 1. Of course, other methods of integrating the process flow modules and smart process objects described herein into a standard process control system or process plant may be used as well.

When implemented, any of the software described herein may be stored in any computer readable memory such as on a magnetic disk, a laser disk, or other storage medium in a RAM or ROM of a computer or processor, etc. likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A computer-implementable system for use in viewing and providing functionality in a process plant having a processor, the computer-implementable system comprising:
   a computer readable memory;
   an object stored on the computer readable memory and executable on the processor, the object including:
      a parameter memory storage that stores entity parameter data pertaining to an associated process entity during execution of the object on the processor;
      a graphic representation pictorially representing the associated process entity that is displayed to an operator on a display device during execution of the object on the processor, wherein the graphic representation specifies one or more locations at which other elements may be attached to the graphic representation within the display;
      one or more parameter data inputs or outputs, each input or output pictorially represented on the graphic representation; and
      a method which executes on the processor to perform a function using the entity parameter data to produce an output related to operation of the associated process entity,
   wherein one or both of:
      (1) the method is an error detection method which detects an error for the associated process entity, and
      (2) the method includes an algorithm for detecting a leak.

2. The computer-implementable system of claim 1, wherein the one or more parameter data inputs or outputs includes a parameter data input which receives parameter data from another object executed by the processor within the process plant.

3. The computer-implementable system of claim 1, wherein the method is an error detection method which detects an error for the associated process entity.

4. The computer-implementable system of claim 1, wherein the method includes an alarm generation method which generates an alarm.

5. The computer-implementable system of claim 1, wherein the method includes an algorithm for detecting a leak.

6. The computer-implementable system of claim 1, wherein the method includes a model for modeling behavior of the associated process entity.

7. The computer-implementable system of claim 1, wherein the object further includes a tag for providing communication with the object when the object is executed on the processor.

8. The computer-implementable system of claim 1, wherein the tag may include an alias that is filled in or provided during runtime of the object.

9. The computer-implementable system of claim 1, wherein the object further includes a status indication.

10. The computer-implementable system of claim 1, wherein the object further includes a mode indication which performs differently based on a value of the mode indication.

11. The computer-implementable system of claim 1, wherein the object includes one or more predefined data displays associated with the graphic representation that indicate entity parameter data to be displayed as part of the graphic representation within a display when the object is executed on the processor.

12. The computer-implementable system of claim 1, wherein the one or more parameter data inputs or outputs includes a first parameter data output which provides parameter data to another object executed by the processor.

13. The computer-implementable system of claim 1, wherein the object includes a link to documentation for the associated process entity.

14. The computer-implementable system of claim 1, wherein the object is associated with a connector within the process plant and the object includes an indication of a type of material which flows through the connector.

15. The computer-implementable system of claim 14, wherein the indication is an indication of a fluid.

16. The computer-implementable system of claim 15, wherein the indication is an indication of a gas.

17. The computer-implementable system of claim 14, wherein the method includes an algorithm that models material flow through the connector.

18. The computer-implementable system of claim 14, wherein the method performs a conversion on units of material flowing through the connector.

19. The computer-implementable system of claim 14, wherein the object includes an indication of a direction of material flow through the connector.

* * * * *